United States Patent
Hwang et al.

(10) Patent No.: US 11,527,100 B2
(45) Date of Patent: Dec. 13, 2022

(54) METHOD AND APPARATUS WITH FINGERPRINT VERIFICATION

(71) Applicant: Samsung Electronics Co., Ltd., Suwon-si (KR)

(72) Inventors: Do-Ha Hwang, Hwaseong-si (KR); Sungjoo Suh, Seongnam-si (KR); Ho-Kuen Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 17/155,481

(22) Filed: Jan. 22, 2021

(65) Prior Publication Data

US 2022/0012463 A1 Jan. 13, 2022

(30) Foreign Application Priority Data

Jul. 7, 2020 (KR) .......... 10-2020-0083227
Sep. 14, 2020 (KR) .......... 10-2020-0117660

(51) Int. Cl.
*G06V 40/12* (2022.01)
*G06F 16/532* (2019.01)
*G06V 40/13* (2022.01)
*G06V 10/98* (2022.01)
*G06F 21/32* (2013.01)

(52) U.S. Cl.
CPC ........ *G06V 40/1365* (2022.01); *G06F 16/532* (2019.01); *G06F 21/32* (2013.01); *G06V 10/993* (2022.01); *G06V 40/13* (2022.01)

(58) Field of Classification Search
CPC .... G06V 40/1365; G06V 40/13; G06V 40/12; G06V 10/993; G06F 16/532; G06F 21/32
See application file for complete search history.

(56) References Cited

U.S. PATENT DOCUMENTS

| | | | | |
|---|---|---|---|---|
| 5,109,428 | A | * | 4/1992 | Igaki .......... G07C 9/37 382/125 |
| 5,963,656 | A | * | 10/1999 | Bolle .......... G06V 10/993 382/125 |
| 8,995,730 | B2 | | 3/2015 | Hara et al. |
| 9,361,507 | B1 | | 6/2016 | Hoyos et al. |
| 9,471,765 | B1 | | 10/2016 | Setterberg et al. |

(Continued)

FOREIGN PATENT DOCUMENTS

| KR | 10-2007-0076187 A | 7/2007 |
|---|---|---|
| KR | 10-2020-0004701 A | 1/2020 |

OTHER PUBLICATIONS

Hari et al., Unsharp masking using quadratic filter for the enhancement of fingerprints in noisy background. (Year: 2013).*

(Continued)

*Primary Examiner* — John B Strege
(74) *Attorney, Agent, or Firm* — NSIP Law

(57) ABSTRACT

A method and apparatus with fingerprint verification are disclosed. A processor implemented method includes obtaining a query fingerprint image through a fingerprint sensor, obtaining a processed fingerprint image by performing image processing on the obtained query fingerprint image, obtaining a blended fingerprint image by blending the query fingerprint image and the processed fingerprint image, and performing fingerprint verification based on the blended fingerprint image and a registered fingerprint image.

27 Claims, 12 Drawing Sheets

(56) References Cited

U.S. PATENT DOCUMENTS

| | | |
|---|---|---|
| 9,582,705 B2 | 2/2017 | Du et al. |
| 9,971,929 B2 | 5/2018 | Phillips et al. |
| 10,198,612 B1 | 2/2019 | Hsu |
| 2002/0034319 A1 | 3/2002 | Tumey et al. |
| 2004/0023081 A1 | 11/2004 | Hillhouse |
| 2010/0303310 A1* | 12/2010 | Chiu .................. G06V 40/1359 382/124 |
| 2018/0211093 A1 | 7/2018 | Bae et al. |
| 2018/0247098 A1 | 8/2018 | Yoshii et al. |
| 2018/0285618 A1* | 10/2018 | Feng .................. G06V 40/1376 |
| 2020/0051276 A1 | 2/2020 | Li et al. |
| 2020/0285882 A1* | 9/2020 | Skovgaard Christensen ............... G06T 5/20 |
| 2022/0012463 A1* | 1/2022 | Hwang .................. G06F 21/32 |

OTHER PUBLICATIONS

Extended European Search Report dated Nov. 5, 2021 in counterpart European Patent Application No. 21174413.1 (7 pages in English).

* cited by examiner

METHOD AND APPARATUS WITH FINGERPRINT VERIFICATION

CROSS-REFERENCE TO RELATED APPLICATIONS

This application claims the benefit under 35 USC § 119(a) of Korean Patent Application No. 10-2020-0083227 filed on Jul. 7, 2020, and Korean Patent Application No. 10-2020-0117660 filed on Sep. 14, 2020, in the Korean Intellectual Property Office, the entire disclosures of all of which are incorporated herein by reference for all purposes.

BACKGROUND

1. Field

The following description relates to technologies with fingerprint verification.

2. Description of Related Art

Biometric recognition has been used for security verification, to verify users by using the users' fingerprints, irises, facial features, blood vessels, or other biological characteristics. The underlying biological characteristics used in such verifications are intended to be unique for each user as they may rarely change during the lifetime of a user. Such biological characteristics also pose a low risk of theft or imitation, typically providing reliable security verification.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented method includes obtaining a query fingerprint image through a fingerprint sensor, obtaining a processed fingerprint image by performing image processing on the obtained query fingerprint image, obtaining a blended fingerprint image by blending the query fingerprint image and the processed fingerprint image, and performing fingerprint verification based on the blended fingerprint image and a registered fingerprint image.

The performing of the image processing may include performing filtering on the query fingerprint image using a frequency characteristic of a fingerprint feature of the registered fingerprint image, wherein the frequency characteristic of the fingerprint feature of the registered fingerprint image may be determined based on an interval in a fingerprint pattern in the registered fingerprint image.

The performing of the image processing may include performing filtering on the query fingerprint image using a frequency characteristic of a fingerprint feature of the query fingerprint image, wherein the frequency characteristic of the fingerprint feature of the query fingerprint image may be determined based on an interval in a fingerprint pattern in the query fingerprint image.

The performing of the image processing may include measuring an image quality of the query fingerprint image, and in response to the measured image quality being determined to not satisfy a requirement, performing filtering on the query fingerprint image using a frequency characteristic of a fingerprint feature of the registered fingerprint image.

The performing of the image processing may further include, in response to the measured image quality being determined to satisfy the requirement, performing filtering on the query fingerprint image using a frequency characteristic of a fingerprint feature of the query fingerprint image.

The performing of the image processing may include generating the processed fingerprint image with less noise than the query fingerprint image by performing filtering on the query fingerprint image.

The obtaining of the blended fingerprint image may include determining a blending ratio between the query fingerprint image and the processed fingerprint image, and generating the blended fingerprint image by blending the query fingerprint image and the processed fingerprint image based on the determined blending ratio.

The determining of the blending ratio may include determining the blending ratio based on at least one of an image quality of the query fingerprint image, an interval in a fingerprint pattern in the query fingerprint image, or a total number of fingerprint feature points detected in the query fingerprint image.

The obtaining of the blended fingerprint image may include generating a first blended fingerprint image by blending the query fingerprint image and the processed fingerprint image based on a first blending ratio, and generating a second blended fingerprint image by blending the query fingerprint image and the processed fingerprint image based on a different second blending ratio.

The performing of the fingerprint verification may include determining a matching relationship between the first blended fingerprint image and the registered fingerprint image, determining a result of the fingerprint verification based on a determined similarity, dependent on the determined matching relationship, between the second blended fingerprint image and the registered fingerprint image.

The first blending ratio may be determined based on an image quality of the query fingerprint image and an interval in a fingerprint pattern in the query fingerprint image, and the second blending ratio may be determined based on the image quality of the query fingerprint image and a total number of fingerprint feature points in the query fingerprint image.

The performing of the fingerprint verification may include determining a matching relationship between the blended fingerprint image and the registered fingerprint image, determining a similarity between the blended fingerprint image and the registered fingerprint image based on the determined matching relationship, and determining a result of the fingerprint verification based on the determined similarity.

The method may further include, in response to a successful result of the fingerprint verification, unlocking an apparatus with respect to user access of the apparatus, or implementing a user verified payment process, where the apparatus may perform the processor implemented method.

The obtaining of the query fingerprint image may further include capturing image information, using the fingerprint sensor, of a finger opposing a surface of the display.

In one general aspect, embodiments include a non-transitory computer-readable storage medium storing instructions that, when executed by one or more processors, cause the one or more processors to perform one or more or all operations and methods disclosed herein.

In one general aspect, an apparatus includes one or more processors configured to perform image processing on a query fingerprint image to obtain a processed fingerprint image, blend the query fingerprint image and the processed fingerprint image to obtain a blended fingerprint image, and perform fingerprint verification based on the blended fingerprint image and a registered fingerprint image.

The apparatus may further include a fingerprint sensor configured to capture the query fingerprint image.

The apparatus may further include a display, wherein the one or more processors may be further configured to, in response to a successful result of the fingerprint verification, implement an unlocking of the apparatus with respect to user access of the apparatus as a user terminal, or implement a user verified payment process of the user terminal.

The apparatus may be a mobile device and the fingerprint sensor may be configured to capture image information of a finger opposing a surface of the mobile device.

For the performance of the image processing, the one or more processors may be configured to perform filtering on the query fingerprint image using a frequency characteristic of a fingerprint feature of the registered fingerprint image, wherein the frequency characteristic of the fingerprint feature of the registered fingerprint image may be determined based on an interval in a fingerprint pattern in the registered fingerprint image.

For the performance of the image processing, the one or more processors may be configured to perform filtering on the query fingerprint image using a frequency characteristic of a fingerprint feature of the query fingerprint image, wherein the frequency characteristic of the fingerprint feature of the query fingerprint image may be determined based on an interval in a fingerprint pattern in the query fingerprint image.

For the blending of the query fingerprint image and the processed fingerprint image, the one or more processors may be configured to determine a blending ratio between the query fingerprint image and the processed fingerprint image, and generate the blended fingerprint image by blending the query fingerprint image and the processed fingerprint image based on the determined blending ratio.

The one or more processors may be further configured to obtain the blended fingerprint image through implementation of a blending of the query fingerprint image and the processed fingerprint image based on a first blending ratio to generate a first blended fingerprint image, and through implementation of another blending of the query fingerprint image and the processed fingerprint image based on a different second blending ratio to generate a second blended fingerprint image.

For the performance of the fingerprint verification, the one or more processors may be configured to determine a matching relationship between the first blended fingerprint image and the registered fingerprint image, and determine a result of the fingerprint verification based on a similarity, dependent on the determined matching relationship, between the second blended fingerprint image and the registered fingerprint image.

In one general aspect, a user terminal includes a fingerprint sensor configured to obtain a query fingerprint image, a display, and one or more processors configured to perform image processing on a query fingerprint image to obtain a processed fingerprint image, combine the query fingerprint image and the processed fingerprint image to obtain a combined fingerprint image, and perform fingerprint verification based on the combined fingerprint image and a registered fingerprint image.

The fingerprint sensor may be disposed inside the user terminal and configured to obtain the query fingerprint image by sensing a query fingerprint of a user being in contact with the display.

The user terminal may be a mobile device, and the one or more processors may be further configured to selectively, based on a result of the performed fingerprint verification, permit user access or use of one or more functions of the mobile device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
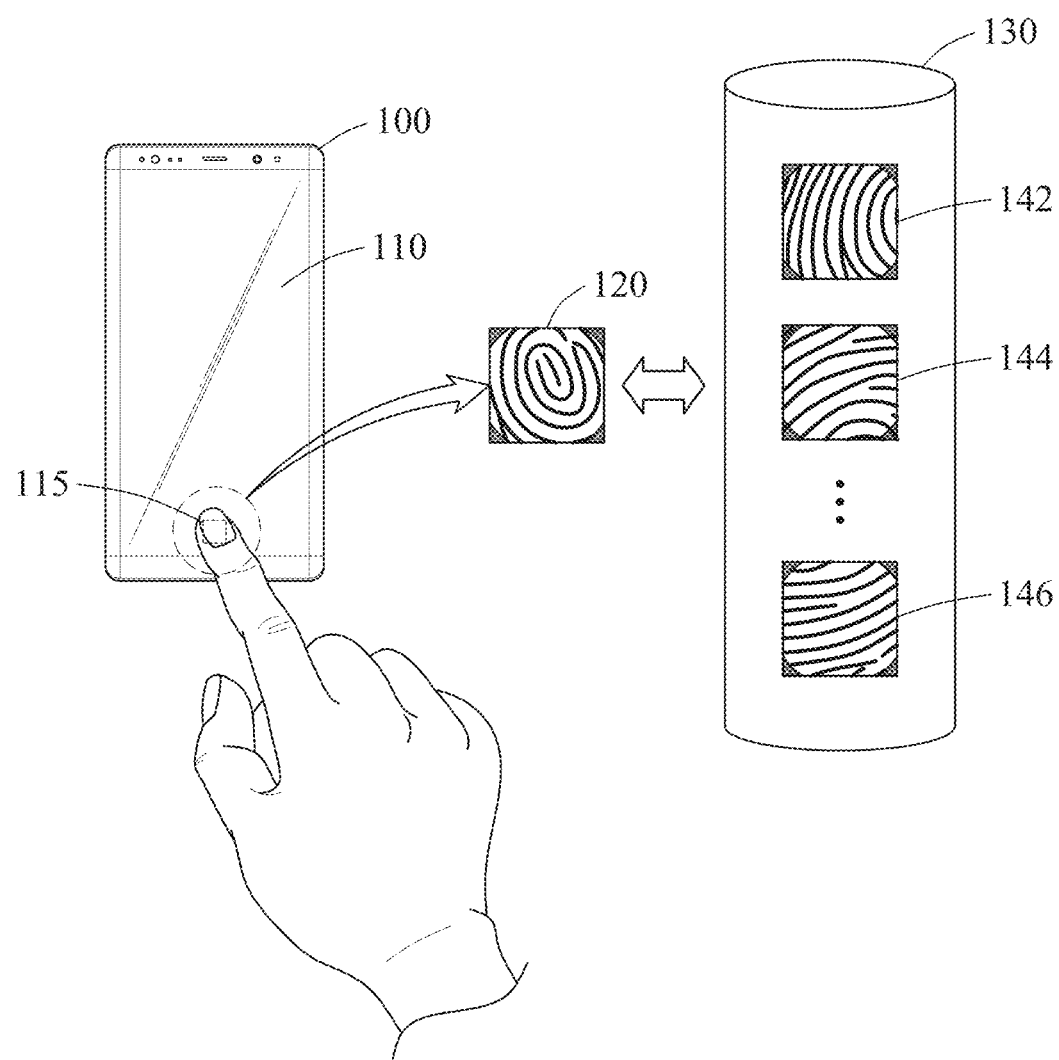
FIG. 1 is a diagram illustrating an example fingerprint verification.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the present disclosure may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description could cause ambiguous interpretation of the example embodiments. Examples will be described in detail with reference to the accompanying drawings, and like reference numerals in the drawings refer to like elements throughout.

FIG. 1 is a diagram illustrating an example fingerprint verification.

Fingerprint verification refers to a biometrics-based verification approach used to determine whether a user is a valid user, and applications or devices, for example, of or with user log-in, payment services, financial services, and access control with such user verification. Referring to FIG. 1, a fingerprint verification apparatus such verification is included in, or represented by, an electronic apparatus 100. The electronic apparatus 100 is representative of various types of products, such as, for example, a smartphone, a wearable device, a tablet personal computer (tablet), a desktop, a laptop, a netbook, a personal digital assistant (PDA), a set-top box, a home appliance, a biometrics-based door lock, a security device, a smart vehicle, and other consumer electronics/information technology (CE/IT) devices or any other devices capable of wireless communication or network communication consistent with those disclosed herein, all as non-limiting examples.

The electronic apparatus 100 may sense or obtain a fingerprint image 120 through a fingerprint sensor 115, noting that positions or locations of the fingerprint sensor 115 are not limited to those demonstrated in FIG. 1. The fingerprint image 120 may include a fingerprint pattern including ridges and valleys in a fingerprint. The electronic apparatus 100 may analyze the fingerprint pattern in the fingerprint image 120 and determine whether a user attempting access to the electronic apparatus 100 is a valid user. For example, when the user inputs a fingerprint of the user to cancel a lock state of the electronic apparatus 100, the electronic apparatus 100 may determine whether to cancel the lock state of the electronic apparatus 100 based on the fingerprint image 120 obtained through the fingerprint sensor 115 and registered fingerprint images 142, 144, and 146 stored in a registered fingerprint database (DB) 130, for example. The fingerprint image 120 input by the user for fingerprint verification may also be referred to herein as a query fingerprint image or an input fingerprint image. The registered fingerprint DB 130 may store therein the registered fingerprint images 142, 144, and 146 of one or more fingers or feature information associated with the registered fingerprint images 142, 144, and 146, for example, frequency information of a fingerprint pattern. FIG. 1 is illustrative of the fingerprint DB 130 being a memory of the electronic apparatus 100 and being a memory separate from the electronic apparatus 100, as non-limiting examples.

A valid user may register, in advance, fingerprint information of the valid user in the electronic apparatus 100 in a fingerprint registration process, and the electronic apparatus 100 may store the fingerprint information registered by the valid user in the registered fingerprint DB 130 or a cloud storage medium, for example. In the fingerprint registration process, the user may register a plurality of fingerprint images, for example, the fingerprint images 142, 144, and 146 as illustrated, and the registered fingerprint information may be stored in a form of registered fingerprint image, for example.

The fingerprint sensor 115 may be present as a separate and independent sensor, or embedded in a button of the electronic apparatus 100. The fingerprint sensor 115 may be disposed inside the electronic apparatus 100 as illustrated in FIG. 1. For example, the fingerprint sensor 115 may be disposed in the illustrated lower portion of a display 110 of the electronic apparatus 100.

For example, in an example with the fingerprint sensor 115 disposed in the electronic apparatus 100, a user may touch the display 110 with his/her finger to input a fingerprint of the user, and the fingerprint sensor 115 in or under the display 110 may sense the fingerprint of the user being in contact with the display 110 to obtain the fingerprint image 120. In such an example, the user may input the fingerprint only by touching the display 110, e.g., without a need to find a separate sensor or button to input the fingerprint, noting that examples are not limited thereto. Thus, it may be highly convenient. With the fingerprint being sensed through the display 110, and a low-quality fingerprint image may be obtained by the fingerprint sensor 115.

The low-quality fingerprint image may result in a false acceptance or rejection, and thus may contribute to reducing accuracy or recognition rate in fingerprint verification. An image processing that may improve a verification quality of a fingerprint pattern in the fingerprint image 120 may be performed after the fingerprint image 120 is obtained by the fingerprint sensor 115. Through the image processing, the fingerprint pattern in the fingerprint image 120 may become clearer and more identifiable, and thus the performance of the fingerprint verification may be improved. When the fingerprint image 120 has a fingerprint pattern that is not easy to be identified, a detailed element of the fingerprint pattern could be removed if the image processing is performed or during image processing to remove noise from the fingerprint image 120, and thus the fingerprint pattern could become more unidentifiable or less useful for verification. In addition, when intervals within the fingerprint pattern in the fingerprint image 120 are wide, detailed elements of the fingerprint pattern may be removed during the image processing in which a low-frequency filter is applied to the fingerprint image 120.

One or more embodiments demonstrate technological approaches that may, thus, improve on previous technological approaches, helping or striving to maintain a high or higher level of accuracy in fingerprint verification even when an image quality of a fingerprint image is low, and thus and thus improve the performance of fingerprint verification.

Figure 2:
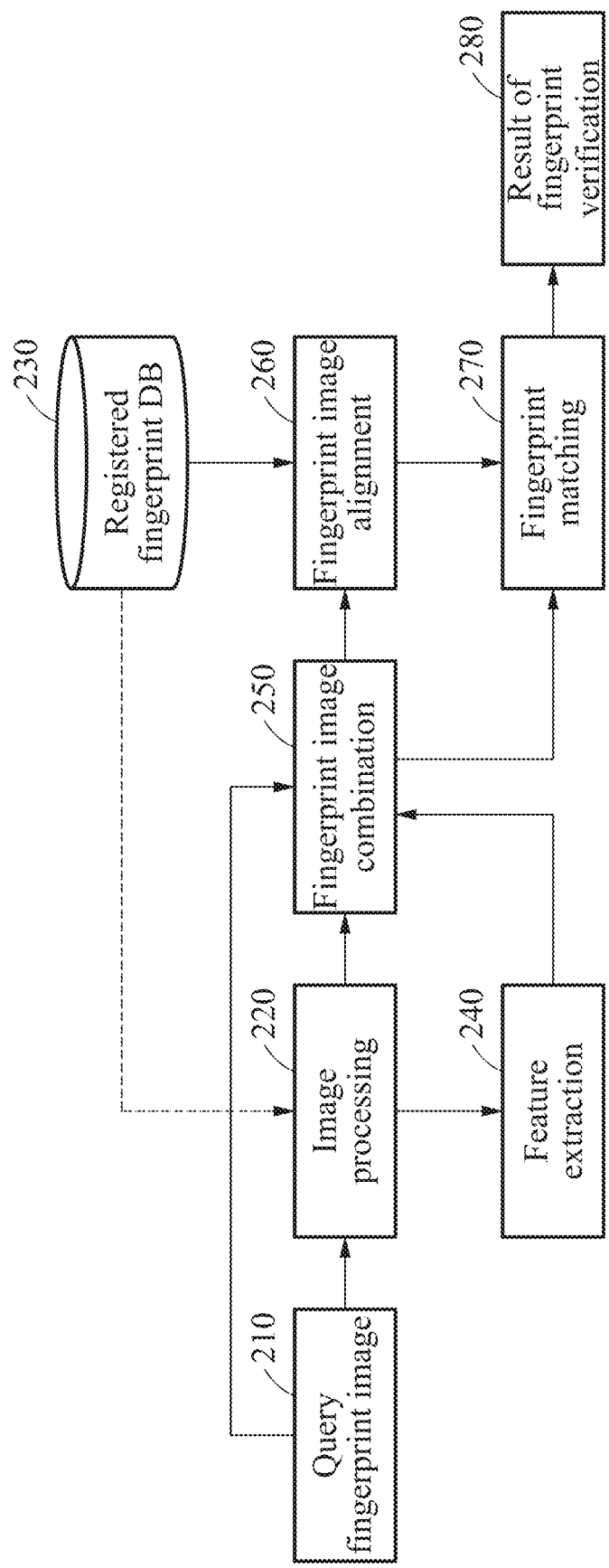
FIG. 2 is a flow chart diagram illustrating an example fingerprint verification.

FIG. 2 is a flow chart diagram illustrating an example fingerprint verification.

In a fingerprint verification process, a fingerprint verification apparatus may obtain a processed fingerprint image by performing image processing that may improve a fingerprint pattern in a query fingerprint image, and generate a combined (blended) fingerprint image by combining (blending) the query fingerprint image (before the image processing) and the processed fingerprint image (after the image processing). The fingerprint apparatus may be the electronic apparatus 100 of FIG. 1 or any other or combination of fingerprint verification or electronic apparatuses discussed herein. In an example, the generated combined fingerprint image may include a detailed element of the fingerprint pattern that could have otherwise been destroyed in image processing. For example, even though image processing is performed prior to the generation of the combined fingerprint image, the fingerprint pattern in the combined fingerprint may still include such detailed elements. The fingerprint verification apparatus may perform fingerprint verification based on the combined fingerprint image, and thus improve the accuracy in the fingerprint verification without a speed degradation in the fingerprint verification compared to previous approaches.

Referring further to FIG. 2, in operation 210, the fingerprint verification apparatus receives, e.g., captures, is provided, or obtains, a query fingerprint image which is a target for fingerprint verification.

In operation 220, the fingerprint verification apparatus performs image processing on the query fingerprint image to improve a fingerprint pattern of the query fingerprint image. The image processing may include an image processing operation that attempts to reduce noise included in the query fingerprint image and makes the fingerprint pattern clearer or more defined. For example, the image processing may include applying a band-pass filter that varies a frequency band to the query fingerprint image and applying a directional filter to the query fingerprint image. Through the image processing, the processed fingerprint image may be obtained.

The fingerprint verification apparatus may measure an image quality of the query fingerprint image, extract a center frequency band from the query fingerprint image, and determine a confidence of the extracted center frequency band. The center frequency band may be extracted through a Fourier transform performed on the query fingerprint image. The fingerprint verification apparatus may determine whether to perform the image processing based on a frequency characteristic of a fingerprint feature of a registered fingerprint image stored in a registered fingerprint DB 230, based on the determined confidence. The confidence may depend on the image quality of the query fingerprint image. Thus, when the image quality of the query fingerprint image decreases, the confidence may decrease.

When the image quality of the query fingerprint image is determined to be greater than or equal to a reference value, or when the confidence of the center frequency band extracted from the query fingerprint image is determined to be greater than or equal to a reference value, the fingerprint verification apparatus may perform the image processing based on a frequency characteristic of a fingerprint feature of the query fingerprint image. In such an example, the fingerprint verification apparatus may apply, to the query fingerprint image, a filter based on the frequency characteristic (e.g., the center frequency band) of the fingerprint feature of the query fingerprint image. For example, the frequency characteristic indicated or demonstrated by the fingerprint feature may be determined based on sharpness indicated or demonstrated in a per-radius magnitude histogram in a frequency domain which is obtained by transforming the query fingerprint image into the frequency domain through the Fourier transform. When magnitudes are distributed broadly in the per-radius magnitude histogram, the confidence of the frequency band of the fingerprint pattern may decrease. When the magnitudes are distributed narrowly in the per-radius magnitude histogram, the confidence of the frequency band of the fingerprint pattern may increase.

When the measured image quality of the query fingerprint image is determined to be less than the reference value, or when the confidence of the center frequency band extracted from the query fingerprint image is determined to be less than the reference value, the fingerprint verification apparatus may perform the image processing based on a frequency characteristic (e.g., a center frequency band) of a fingerprint feature of a registered fingerprint image. In such an example, the fingerprint verification apparatus may apply, to the query fingerprint image, a filter based on the frequency characteristic of the fingerprint feature of the registered fingerprint image. The frequency characteristic of the fingerprint feature of the registered fingerprint image may be frequency information indicated or demonstrated by a fingerprint pattern of ridges and valleys of a fingerprint, and may be determined based on an interval between the ridges or the valleys. For example, when the ridges are densely disposed, such a dense disposition may indicate or demonstrate a high-frequency characteristic. When the ridges are sparsely disposed, such a sparse disposition may indicate or demonstrate a low-frequency characteristic. The fingerprint verification apparatus may perform filtering on the query fingerprint image based on the frequency characteristic indicated or demonstrated by the fingerprint pattern of the registered fingerprint image.

The registered fingerprint image may be obtained as a high-quality image, and thus the frequency characteristic of the fingerprint pattern in the registered fingerprint image may be more desirable than the frequency characteristic of the fingerprint pattern in the query fingerprint image. When the image quality of the query fingerprint image is determined to be less than the reference value, the fingerprint verification apparatus may perform the image processing that is determined more suitable for such a low-quality query fingerprint image using the frequency characteristic of the registered fingerprint image. Thus, it is possible to improve the performance of the fingerprint verification. That is, for such a low-quality query fingerprint image from which a frequency characteristic may not be readily verified, it is possible to perform effective image processing by performing filtering using the frequency characteristic of the registered fingerprint image.

In operation 240, the fingerprint verification apparatus extracts a feature from the processed fingerprint image obtained through the image processing. For example, the fingerprint verification apparatus may determine the number of fingerprint feature points (e.g., minutiae) in the processed fingerprint image.

In operation 250, the fingerprint verification apparatus generates a combined fingerprint image by combining, for example, blending, the query fingerprint image and the processed fingerprint image. Through such a combination of the fingerprint images, it is possible to restore, without a loss of time, a high-frequency component that may have been removed or lessened during the image processing.

A condition for the combination of the query fingerprint image and the processed fingerprint image may be dynamically adjusted. For example, a combination (blending) ratio between the query fingerprint image and the processed fingerprint image may be determined to dynamically vary depending on a determined state of the fingerprint pattern in the query fingerprint image. For example, the combination ratio may be determined based on the determined image quality of the query fingerprint image, determined interval in the fingerprint pattern (e.g., an interval between ridges or valleys), determined frequency characteristic of the fingerprint pattern, determined number of fingerprint feature points, or any combination thereof.

In an example in which the interval in the fingerprint pattern is determined to be wide and filtering is selected to be performed on the query fingerprint image using a low-pass filter based on a frequency characteristic of the fingerprint pattern, detailed elements of the fingerprint pattern corresponding to a high-frequency band may be reduced greatly although an overall form of the fingerprint pattern may be well maintained. However, through the combination of the fingerprint images described above, the reduced detailed elements may be restored by the combination. In addition, in an example in which the number of fingerprint feature points in the query fingerprint image is determined low, the fingerprint pattern may be less identifiable, and thus a probability of false acceptance may increase. However, through the combination of the fingerprint images described above, it may be possible to improve the identifiability of the fingerprint pattern and reduce the probability of false acceptance.

A combined fingerprint image to be used in operation 260 of fingerprint image alignment and a combined fingerprint image to be used in operation 270 of fingerprint matching may differ from each other. For example, a first combined fingerprint image generated at a first combination ratio may be used in the fingerprint image alignment, and a second combined fingerprint image generated at a second combination ratio, different from the first combination ratio, may be used in the fingerprint matching. As described above, the combination of the query fingerprint image and the processed fingerprint image may be dynamically performed based on the purpose of various embodiment implementations.

In operation 260, the fingerprint verification apparatus performs the fingerprint image alignment between the combined fingerprint image and the registered fingerprint image stored in the registered fingerprint DB 230. The fingerprint image alignment may include determining a matching region between the corresponding combined fingerprint image and the registered fingerprint image by determining rotation information and translation information. The matching region may be a corresponding or matching fingerprint region in the combined fingerprint image and the registered fingerprint image, which is a region estimated to have a same or similar fingerprint pattern therebetween.

In operation 270, the fingerprint verification apparatus performs the fingerprint matching between the corresponding combined fingerprint image and the registered fingerprint image based on a result of the fingerprint image alignment. The fingerprint verification apparatus may calculate a similarity in a fingerprint pattern in the matching region between the combined fingerprint image and the registered fingerprint image. The fingerprint verification apparatus may use, as the similarity, a feature value derived through a fast Fourier transform (FFT) on the combined fingerprint image and the registered fingerprint image. For example, the fingerprint verification apparatus may calculate the similarity through an image frequency information-based matching method, such as, for example, a Fourier-Mellin method. In addition to the Fourier-Mellin method, various alternate methods may be used to determine the similarity in the fingerprint pattern. For example, the similarity may be determined based on a distribution or form of feature points extracted from the fingerprint pattern.

In operation 280, the fingerprint verification apparatus determines a result of the fingerprint verification based on a result of the fingerprint matching. The fingerprint verification apparatus may determine whether the fingerprint verification is successful based on the similarity in the matching region. For example, when the similarity satisfies a requirement for the fingerprint verification, for example, when the similarity is greater than or equal to a threshold value, the fingerprint verification apparatus may determine the fingerprint verification to be successful. When the similarity does not satisfy the requirement for the fingerprint verification, for example, when the similarity is less than the threshold value, the fingerprint verification apparatus may determine the fingerprint verification to be unsuccessful.

Figure 3:
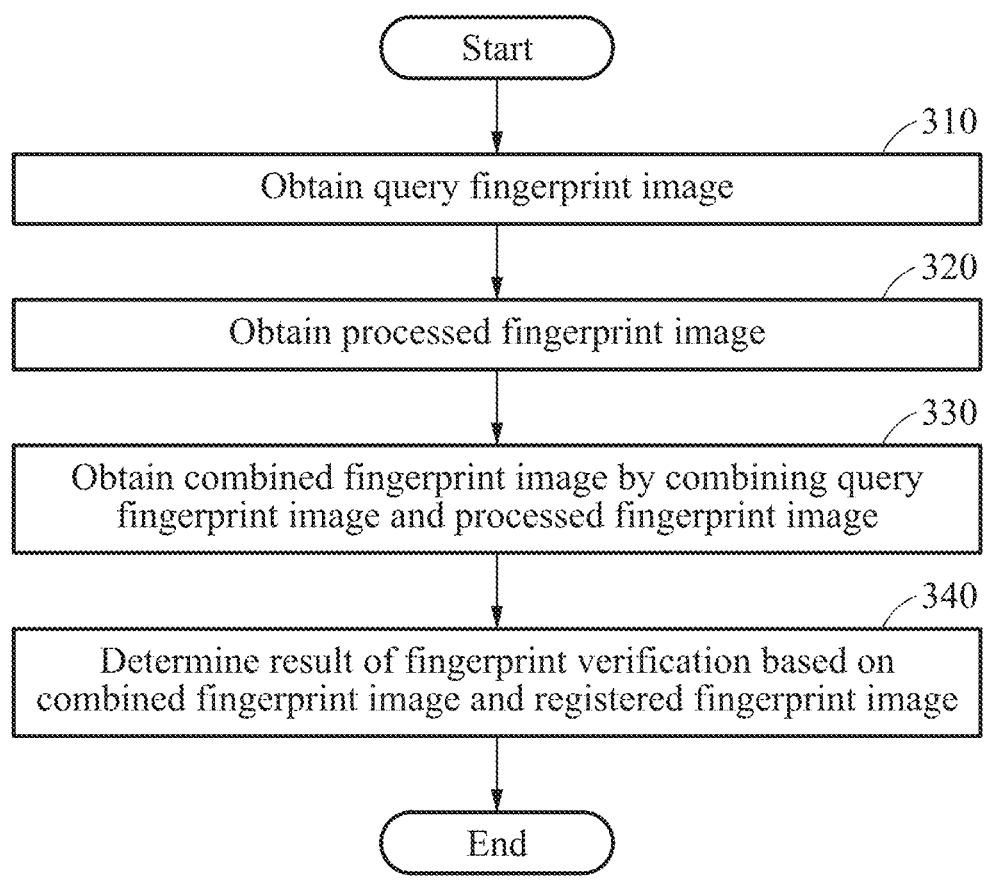
FIGS. 3 through 5 are flowcharts illustrating an example fingerprint verification.
Figure 4:
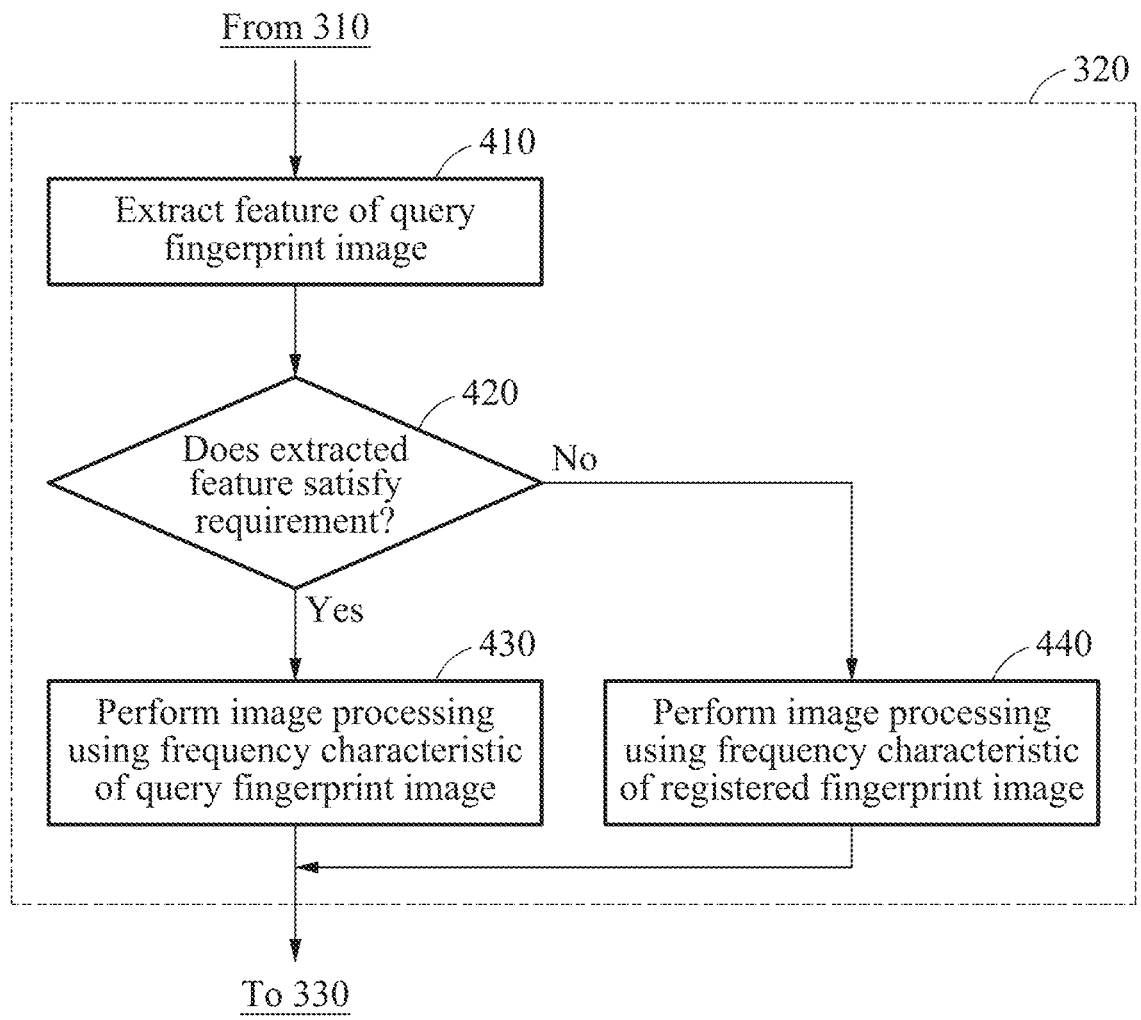
Figure 5:
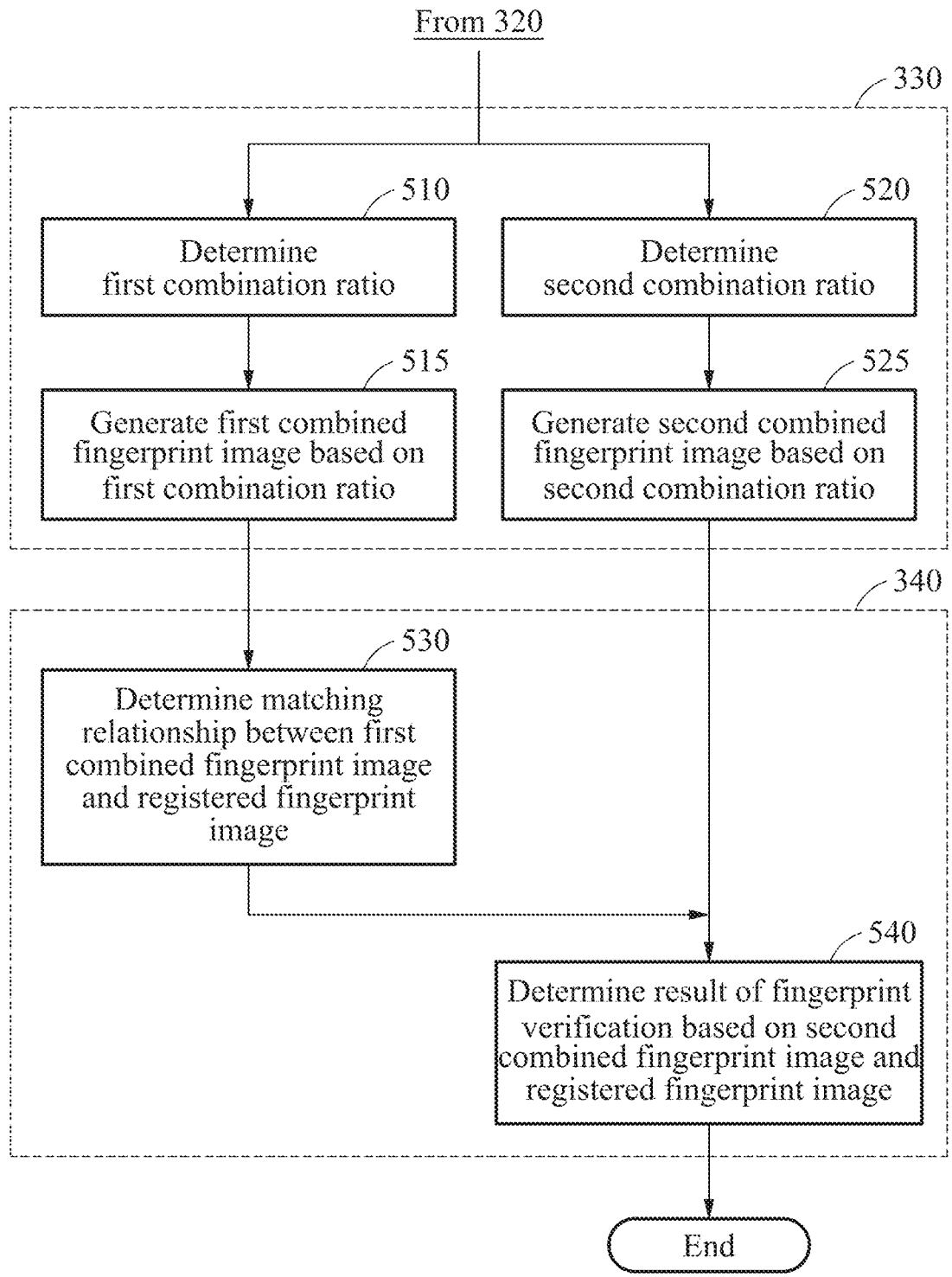

FIGS. 3 through 5 are flowcharts illustrating an example fingerprint verification.

Referring to FIG. 3, in operation 310, a fingerprint verification apparatus obtains a query fingerprint image through a fingerprint sensor. The fingerprint sensor may be included in the fingerprint verification apparatus, or be present outside the fingerprint verification apparatus. The fingerprint apparatus may be the electronic apparatus 100 of FIG. 1 or any other or combination of fingerprint verification or electronic apparatuses discussed herein.

In operation 320, the fingerprint verification apparatus obtains a processed fingerprint image by performing image processing on the obtained query fingerprint image. For example, the fingerprint verification apparatus may generate the fingerprint image with less noise than the query fingerprint image by performing filtering on the query fingerprint image.

In an example, the fingerprint verification apparatus may perform filtering on the query fingerprint image using a determined frequency characteristic of a fingerprint feature of a registered fingerprint image. The frequency characteristic of the fingerprint feature of the registered fingerprint image may be based on a determined or obtained interval in a fingerprint pattern in the registered fingerprint image. For example, when an interval between ridges of a fingerprint is small, such a small interval may indicate or demonstrate a high-frequency characteristic of a center frequency band. When the interval between the ridges is large, such a large interval may indicate or demonstrate a low-frequency characteristic of the center frequency band. Thus, the fingerprint verification apparatus may perform filtering on the query fingerprint image based on a determined center frequency band of the fingerprint pattern in the registered fingerprint image.

In another example, the fingerprint verification apparatus may perform filtering on the query fingerprint image using a determined frequency characteristic of a fingerprint feature of the query fingerprint image. The frequency characteristic of the fingerprint feature of the query fingerprint image may be based on a determined interval in a fingerprint pattern in the query fingerprint image. The fingerprint verification apparatus may perform filtering on the query fingerprint image based on a determined center frequency band of the fingerprint pattern in the query fingerprint image.

In still another example, the filtering may vary depending on a determined state of the query fingerprint image. For example, referring to FIG. 4, in operation 410 the fingerprint verification apparatus extracts a feature of the query fingerprint image. For example, the fingerprint verification apparatus may extract a frequency characteristic of a fingerprint pattern in the query fingerprint image, or measure an image quality of the query fingerprint image. In operation 420, the fingerprint verification apparatus determines whether the extracted feature satisfies a requirement. For example, when the measured image quality of the query fingerprint image is greater than a threshold value, the fingerprint verification apparatus may determine that the extracted feature satisfies the requirement. However, when the measured image quality of the query fingerprint image is less than or equal to the threshold value, the fingerprint verification apparatus may determine that the extracted feature does not satisfy the requirement.

In operation 430, when the extracted feature satisfies the requirement, the fingerprint verification apparatus obtains the processed fingerprint image by performing filtering on the query fingerprint image using the frequency characteristic of the fingerprint feature of the query fingerprint image. In operation 440, when the extracted feature does not satisfy the requirement, the fingerprint verification apparatus obtains the processed fingerprint image by performing filtering on the query fingerprint image using the frequency characteristic of the fingerprint feature of the registered fingerprint image. Here, when the measured image quality of the query fingerprint image is less than a threshold value and the image quality of the query fingerprint image is thus determined to be relatively low, the fingerprint verification apparatus may perform filtering on the query fingerprint image based on the frequency characteristic of the registered fingerprint image. As described above, adaptive frequency filtering may be effectively performed on the query fingerprint image of a low quality based on the frequency characteristic of the registered fingerprint image.

Referring back to FIG. 3, in operation 330, the fingerprint verification apparatus obtains a combined fingerprint image by combining the query fingerprint image and the processed fingerprint image. In an example, the fingerprint verification apparatus may generate the combined fingerprint image by determining a combination ratio between the query fingerprint image and the processed fingerprint image, and combining the query fingerprint image and the processed fingerprint image based on the determined combination ratio. For example, the fingerprint verification apparatus may determine the combination ratio based on the determined image quality of the query fingerprint image, the interval in the fingerprint pattern in the query fingerprint image (e.g., the frequency characteristic of the fingerprint pattern), and/or the determined number of fingerprint feature points detected in the query fingerprint image. The number of the fingerprint feature points may correspond to the number of minutiae extracted from the processed fingerprint image.

In operation 340, the fingerprint verification apparatus determines a result of fingerprint verification based on the combined fingerprint image and the registered fingerprint image stored in a registered fingerprint DB. The fingerprint verification apparatus may determine a matching relationship between the combined fingerprint image and the registered fingerprint image, and determine a similarity between the combined fingerprint image and the registered fingerprint image based on the determined matching relationship. For example, the fingerprint verification apparatus may determine a matching region between the combined fingerprint image and the registered fingerprint image by comparing the combined fingerprint image and the registered fingerprint image, and determine the similarity in the determined matching region between the combined fingerprint image and the registered fingerprint image. The fingerprint verification apparatus may determine the result of the fingerprint verification based on whether the determined similarity satisfies a requirement. For example, when the similarity is greater than or equal to a threshold value, the fingerprint verification apparatus may determine the fingerprint verification to be successful. When the similarity is less than the threshold value, the fingerprint verification apparatus may determine the fingerprint verification to be unsuccessful. When a similarity between a fingerprint pattern in the combined fingerprint image and a fingerprint pattern in the registered fingerprint image increases, the similarity in the matching region may be determined to be a higher value.

When the fingerprint verification is determined to be successful, the fingerprint verification apparatus may perform a subsequent operation, for example, assigning an access right to a user or approving payment. When the fingerprint verification is determined to be unsuccessful, the fingerprint verification apparatus may perform a restricting operation, for example, blocking access by a user or rejecting the approval of payment.

According to one or more examples, the fingerprint verification apparatus may apply different combination ratios in each fingerprint matching operation. For example, the fingerprint verification apparatus may generate combined fingerprint images at different combination ratios between the query fingerprint image and the processed fingerprint image based on the determined state of the query fingerprint image and the purpose of each fingerprint matching operation. The fingerprint verification apparatus may then determine a result of fingerprint verification using the generated combined fingerprint images. Referring to FIG. 5, in operation 510, the fingerprint verification apparatus determines a first combination ratio based on the image quality of the query fingerprint image and the interval in the fingerprint pattern in the query fingerprint image, for example, a frequency characteristic of the fingerprint pattern. In operation 515, the fingerprint verification apparatus generates a first combined fingerprint image by combining the query fingerprint image and the processed fingerprint image based on the first combination ratio.

In operation 520, the fingerprint verification apparatus determines a second combination ratio based on the image quality of the query fingerprint image and the determined number of fingerprint feature points (e.g., minutiae) in the query fingerprint image. In operation 525, the fingerprint verification apparatus generates a second combined fingerprint image by combining the query fingerprint image and the processed fingerprint image based on the second combination ratio. The second combination ratio may differ from the first combination ratio. For example, and as non-limiting examples, in an example in which a ratio between a query fingerprint image X and a processed fingerprint image Y to be applied to a combined fingerprint image is X:Y, the first combination ratio may be determined to be 5:5 and the second combination ratio may be determined to be 3:7.

In operation 530, the fingerprint verification apparatus determines a matching relationship between the first combined fingerprint image generated based on the first combination ratio and a registered fingerprint image. The fingerprint verification apparatus may determine a matching region of a fingerprint pattern by performing image alignment on the first combined fingerprint image and the registered fingerprint image through a frequency-based method, such as, for example, phase-only correlation (POC).

In operation 540, the fingerprint verification apparatus determines the result of the fingerprint verification based on a similarity between the second combined fingerprint image generated based on the second combination ratio and the registered fingerprint image. The similarity may indicate or demonstrate a similarity in fingerprint pattern between the second combined fingerprint image and the registered fingerprint image when the second combined fingerprint image and the registered fingerprint image are in the matching relationship determined in operation 530. The fingerprint verification apparatus may measure the similarity through a method such as, for example, normalized cross-correlation (NCC), when the second combined fingerprint image and the registered fingerprint image are aligned based on the matching region.

In an example of using the frequency-based method such as POC to determine the matching relationship, many frequency components with many detailed elements added may be advantageous. In addition, in an example of a similarity measuring method such as NCC, a clearer fingerprint pattern may be advantageous. Thus, a proportion of the query fingerprint image may be higher in the first combination (blending) ratio than the second combination (blending) ratio.

Figure 6:
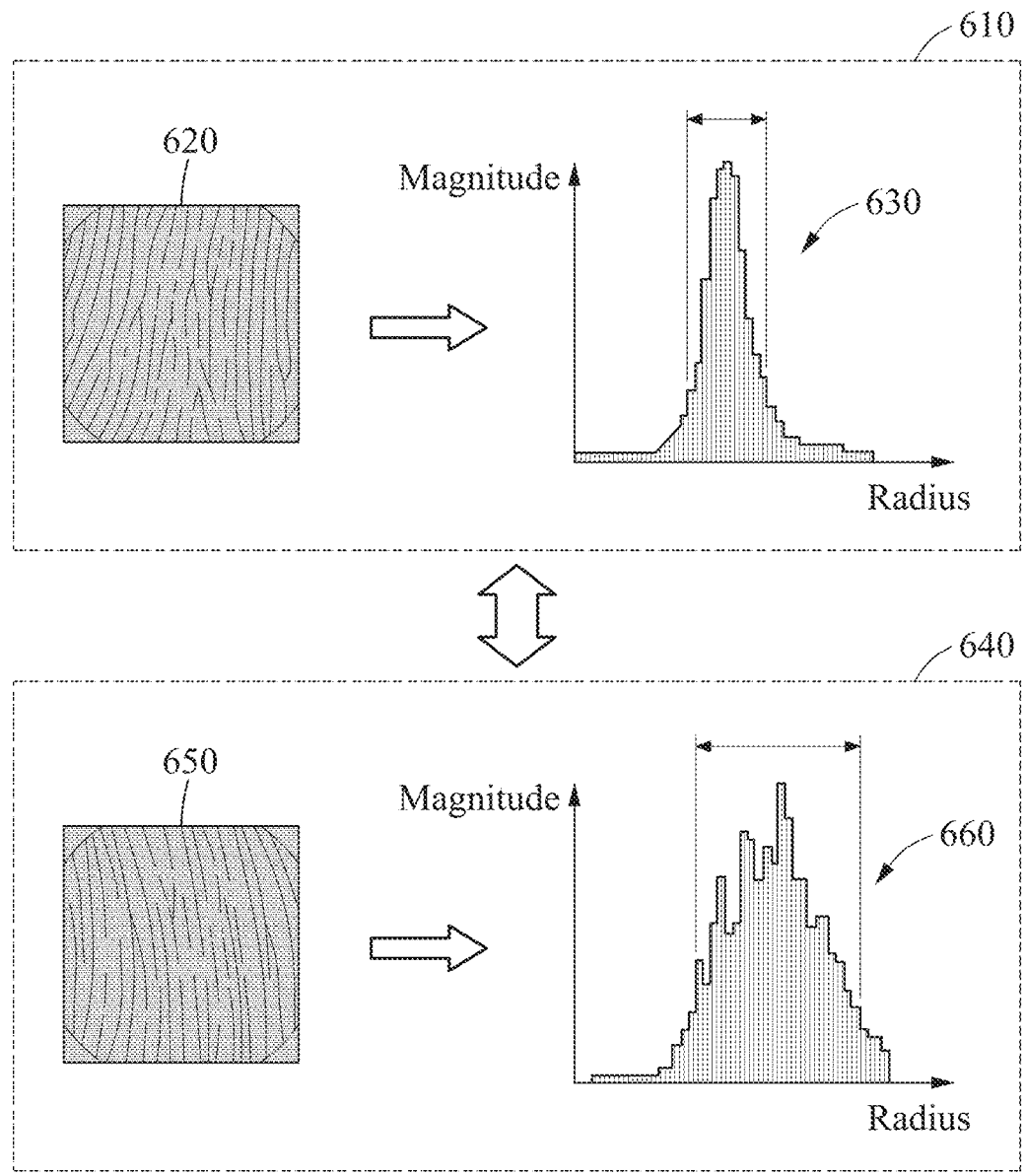
FIG. 6 is a diagram illustrating an example of adaptive frequency filtering based on a frequency characteristic of a query fingerprint image.

FIG. 6 is a diagram illustrating an example of adaptive frequency filtering based on a frequency characteristic of a query fingerprint image.

Referring to FIG. 6, an example 610 demonstrates that when an image quality of a query fingerprint image 620 is relatively high, a confidence of a center frequency band extracted from the query fingerprint image 620 is greater than or equal to a reference value. For example, when performing image processing on the query fingerprint image 620, a fingerprint verification apparatus may perform an FFT on the query fingerprint image 620 and perform bandpass filtering to obtain a per-radius magnitude histogram 630 in a frequency domain. Through the magnitude histogram 630 for each radius, the fingerprint verification apparatus may determine a frequency characteristic of the query fingerprint image 620.

An example 640 demonstrates that when an image quality of a query fingerprint image 650 is relatively low, a confidence of a center frequency band extracted from the query fingerprint image 650 is less than the reference value. Similarly, when performing image processing on the query fingerprint image 650, the fingerprint verification apparatus may perform an FFT on the query fingerprint image 650 and perform bandpass filtering to obtain a per-radius magnitude histogram 660 in the frequency domain. Through the magnitude histogram 660 for each radius, the fingerprint verification apparatus may determine a frequency characteristic of the query fingerprint image 650.

By comparing the magnitude histogram 630 and the magnitude histogram 660, it may be verified that magnitudes for respective radii are narrowly distributed, indicating a high sharpness. Based on such a radius-based magnitude distribution, a frequency characteristic indicated or demonstrated by a fingerprint feature may be estimated. For example, when the radius-based magnitude distribution is narrower, a higher confidence may be set for a center frequency band. For example, when a confidence of a center frequency band of a fingerprint pattern extracted from the query fingerprint image 620 is greater than or equal to the reference value as in the example 610, the fingerprint verification apparatus may perform filtering on the query fingerprint image 620 based on the center frequency band of the fingerprint pattern extracted from the query fingerprint image 620. When a confidence of a center frequency of a fingerprint pattern extracted from the query fingerprint image 650 is less than the reference value as in the example 640, the fingerprint verification apparatus may perform filtering on the query fingerprint image 650 based on a center frequency band or a mean frequency band of a registered fingerprint image.

Figure 7A:
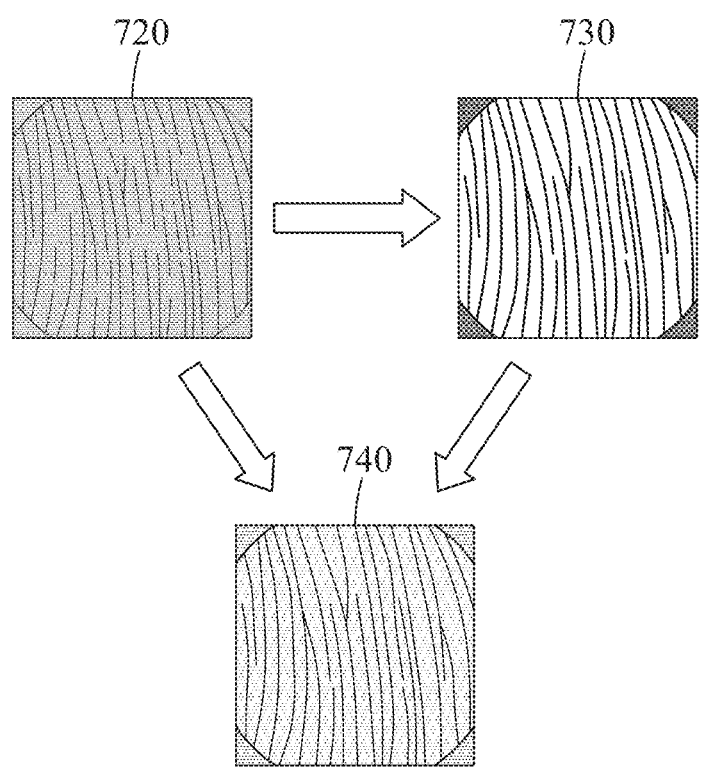
FIG. 7A is a diagram illustrating an example of generating a combined fingerprint image.

FIG. 7A is a diagram illustrating an example of generating a combined fingerprint image.

Referring to FIG. 7A, a fingerprint verification apparatus may obtain a processed fingerprint image 730 by performing image processing on a query fingerprint image 720, and generate a combined fingerprint image 740 by combining the query fingerprint image 720 and the processed fingerprint image 730 based on a determined combination ratio. The combination ratio may be adaptively determined based on a determined state of the query fingerprint image 720, for example, a determined image quality, the determined number of fingerprint feature points, and a determined frequency characteristic of a fingerprint pattern. In a process of the image processing including filtering, a detailed element may be lost or lessened. However, through such a combining process, it is possible to restore the detailed element of a fingerprint pattern that may have be filtered out in the process of image processing. In addition, by adjusting the combination ratio based on the state of the query fingerprint image 720, it is possible to improve the performance of fingerprint verification over previous approaches.

Figure 7B:
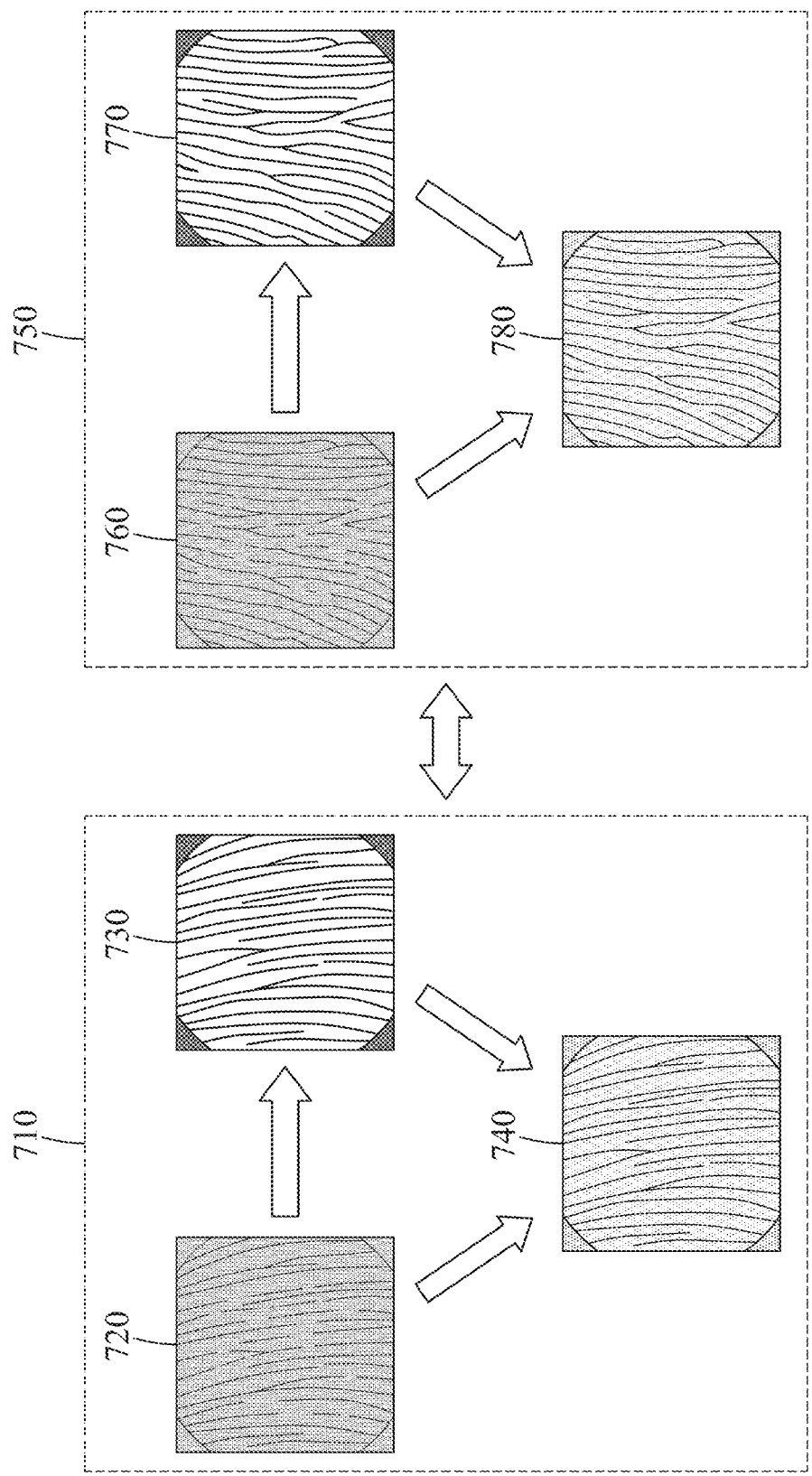
FIG. 7B is a diagram illustrating an example of generating combined fingerprint images at different combination ratios.

FIG. 7B is a diagram illustrating an example of generating combined fingerprint images at different combination ratios.

Referring to FIG. 7B, an example 710 represents a combined fingerprint image 740 generated by combining the query fingerprint image 720 and the processed fingerprint image 730 that are described above in the example of FIG. 7A. In the example 710, it is assumed that a frequency characteristic indicated or demonstrated by a fingerprint pattern in the query fingerprint image 720 indicates or demonstrates a high-frequency characteristic.

An example 750 represents a processed fingerprint image 770 is obtained by performing image processing on a query fingerprint image 760, and a combined fingerprint image 780 is generated by combining the query fingerprint image 760 and the processed fingerprint image 770. A difference in the example 750, from the example 710, is that it is assumed that a frequency characteristic indicated or demonstrated by a fingerprint pattern in the query fingerprint image 760 indicates or demonstrates a low-frequency characteristic.

In the example 750, the fingerprint pattern in the query fingerprint image 760 may have a relatively greater number of low-frequency components, and thus have a higher probability of losing detailed elements of the fingerprint pattern when image processed, such as when filtering is performed on the query fingerprint image 760 to generate the processed fingerprint image 770. The fingerprint verification apparatus may effectively restore the detailed elements of the fingerprint pattern that may have been lost due to the image processing by setting a proportion of the query fingerprint image 760 to be relatively higher than a proportion of the processed fingerprint image 770 when generating the combined fingerprint image 780 in the example 750. In contrast, the fingerprint verification apparatus may set the proportion of the query fingerprint image 720 to be relatively lower than a proportion of the processed fingerprint image 770 when generating the combined fingerprint image 740 in the example 710.

Figure 8:
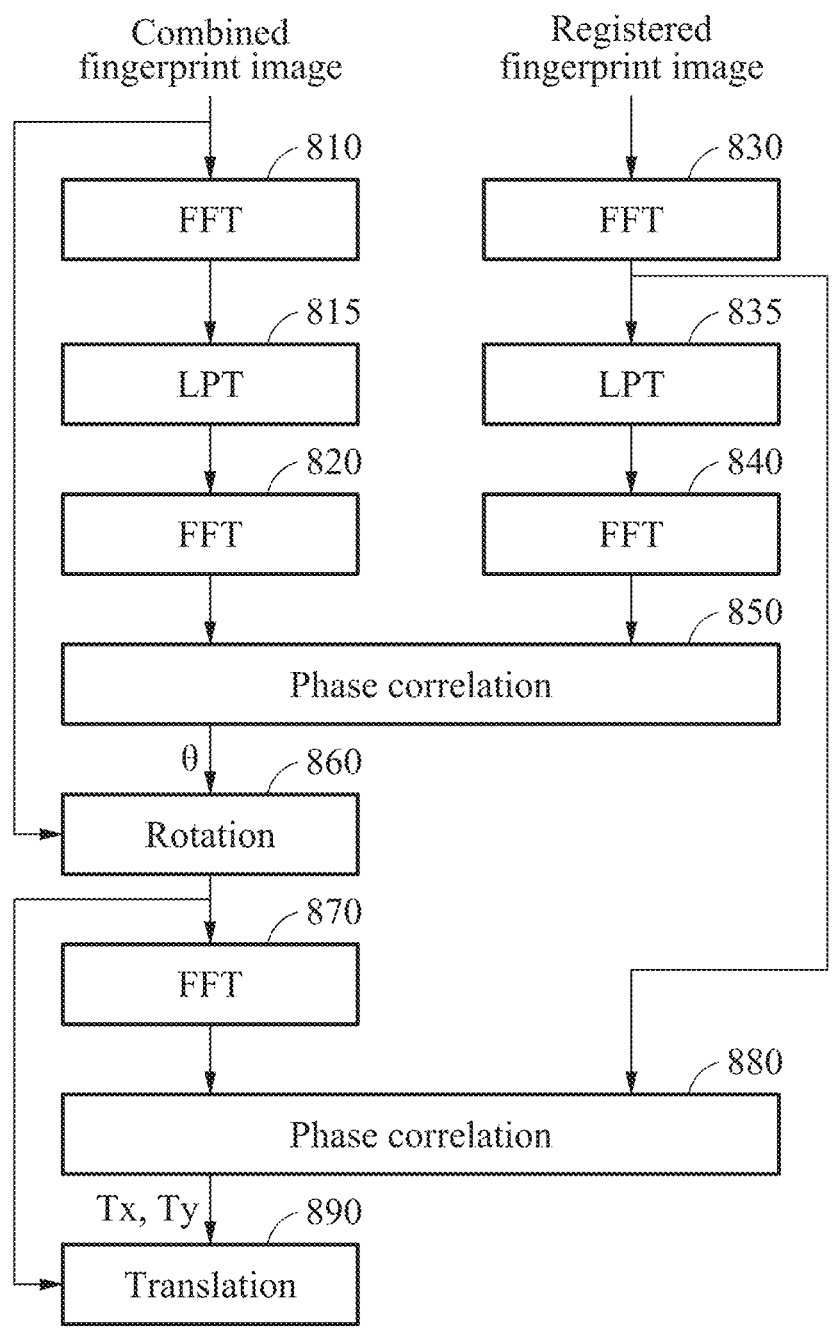
FIGS. 8 and 9 are diagrams illustrating an example of determining a similarity between a combined fingerprint image and a registered fingerprint image.
Figure 9:
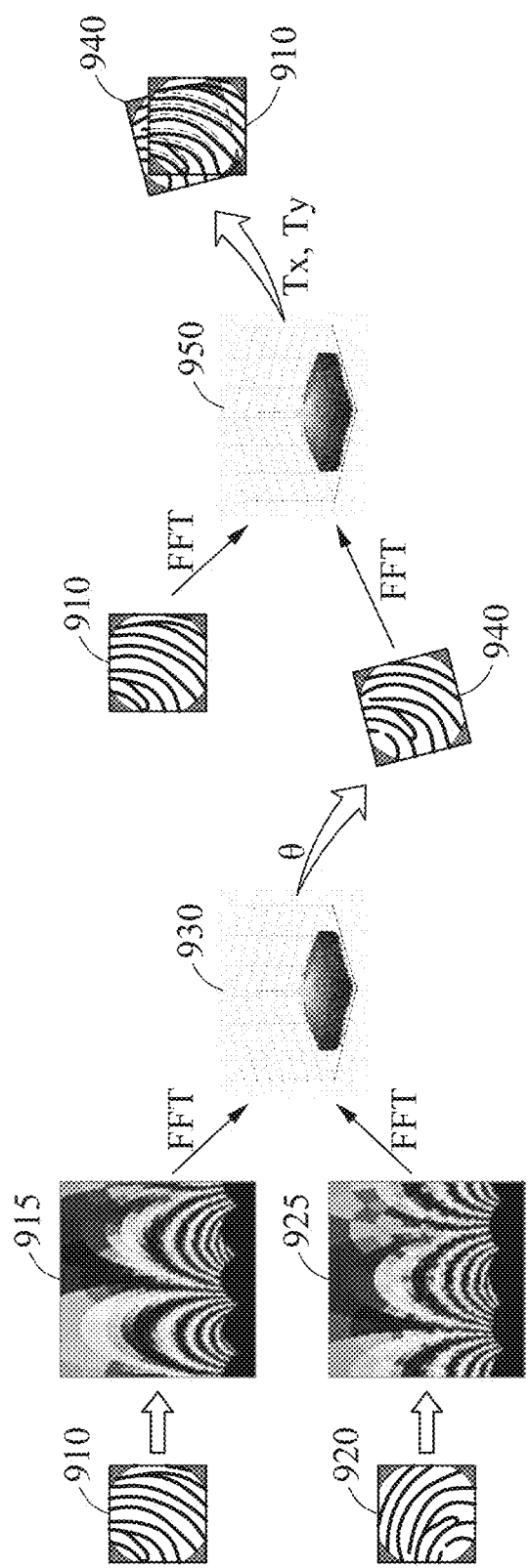

FIGS. 8 and 9 are diagrams illustrating an example of determining a similarity between a combined fingerprint image and a registered fingerprint image.

Referring to FIG. 8, in operation 810, a fingerprint verification apparatus transforms spatial domain information included in a combined fingerprint image into frequency domain information using an FFT. In operation 830, the fingerprint verification apparatus transforms spatial domain information included in a registered fingerprint image into frequency domain information using an FFT. Here, frequency domain information may be based on an orthogonal coordinate system representing information using a two-dimensional (2D) coordinate (x, y).

In operation 815, the fingerprint verification apparatus transforms a coordinate system of the frequency domain information included in the combined fingerprint image into a polar coordinate system using a log-polar transform (LPT). For example, an LPT may be performed on magnitude values of pixels in an FFT image derived through an FFT. In the polar coordinate system, information may be represented by a radius, an angle, or a combination of the radius and the angle. In operation 835, the fingerprint verification apparatus applies an LPT to the frequency domain information included in the registered fingerprint image.

In operation 820, the fingerprint verification apparatus applies an FFT to the combined fingerprint image to which the LPT is applied. In operation 840, the fingerprint verification apparatus applies an FFT to the registered fingerprint image to which the LPT is applied. In operation 850, the fingerprint verification apparatus performs a phase correlation based on a result of the FFT, and detects a peak as the result of performing the phase correlation. In an example, a position of the detected peak may indicate rotation information A between the combined fingerprint image and the registered fingerprint image.

In another example, the position of the detected peak may indicate scale information between the combined fingerprint image and a partial fingerprint image. For example, one axis of an image obtained through an LPT may correspond to angle, and the other axis of the image may correspond to radius. The position of the peak detected through the phase correlation may be represented as a coordinate of the axis corresponding to angle, a coordinate of the axis corresponding to radius. Here, the coordinate of the axis corresponding to angle may indicate the rotation information, and the coordinate of the axis corresponding to radius may indicate the scale information.

In one or more examples, there may be no change in scale in a fingerprint image, and thus a radius may be fixed to be a preset value, for example, 1. In such an example, the position of the peak detected by the phase correlation may be represented as the coordinate of the axis corresponding to angle, and the coordinate of the axis corresponding to angle may indicate the rotation information.

The fingerprint verification apparatus may detect a peak value by performing the phase correlation, and determine a similarity between the combined fingerprint image and the registered fingerprint image based on the detected peak value. In this example, when a region (or an overlapping region) in which the combined fingerprint image and the registered fingerprint image have the same or similar fingerprint pattern the peak value is greater, or a fingerprint pattern of the combined fingerprint image and a fingerprint pattern of the registered fingerprint pattern are more similar to each other, the peak value may tend to increase. Based on such a tendency, the fingerprint verification apparatus may determine the similarity between the combined fingerprint image and the registered fingerprint image based on the peak value detected through the phase correlation.

In operation 860, the fingerprint verification apparatus rotates the combined fingerprint image based on rotation information θ. In operation 870, the fingerprint verification apparatus applies an FFT to the rotated combined fingerprint image. In operation 880, the fingerprint verification apparatus performs a phase correlation based on the combined fingerprint image to which the FFT is applied in operation 870 and the registered fingerprint image to which the FFT is applied in operation 830. As a result of the phase correlation, a peak may be detected, and a position of the detected peak may be represented by translation information (Tx, Ty) between the combined fingerprint image and the registered fingerprint image. In operation 890, the fingerprint verification apparatus translates the combined fingerprint image rotated in operation 860 based on the translation information (Tx, Ty).

The fingerprint verification apparatus may determine a matching relationship between the combined fingerprint image and the registered fingerprint image by rotating and translating the combined fingerprint image based on the obtained rotation information and translation information. In an example, the fingerprint verification apparatus may determine a similarity based on a matching region determined by matching the rotated and translated combined fingerprint image and the registered fingerprint image. The fingerprint verification apparatus may also determine the similarity in various ways. For example, the fingerprint verification apparatus may determine the similarity based on a normalized cross-correlation method which is based on an image brightness value. For example, the fingerprint verification apparatus may determine the similarity based on a correlation derived through Equation 1 as represented below, for example.

$$ncc(I_1, I_2) = \frac{\sum_{(i,j) \in W} I_1(i, j) \cdot I_2(x+i, y+j)}{\sqrt[2]{\sum_{(i,j) \in W} I_1^2(i, j) \cdot \sum_{(i,j) \in W} I_2^2(x+i, y+j)}}$$

Equation 1

In Equation 1, W denotes a matching region between an image $I_1$ and an image $I_2$. $ncc(I_1, I_2)$ denotes a correlation in the matching region W between the image $I_1$ and the image $I_2$. The image $I_1$ is a rotated and translated combined fingerprint image, and the image 12 is a registered fingerprint image. i denotes an X-axis coordinate of a pixel in the matching region W, and j denotes a Y-axis coordinate of the pixel in the matching region W. x denotes translation information Tx in an X-axis direction, and y denotes translation information Ty in a Y-axis direction. $I_1(i, j)$ denotes a pixel value in a (i, j) coordinate of the image $I_1$, and $I_2(x+i, y+j)$ denotes a pixel value in a (x+i, y+j) coordinate of the image $I_2$. A correlation in the matching region W that is calculated through Equation 1 above may be used as the similarity between the combined fingerprint image and the registered fingerprint image.

Although it is illustrated in FIG. 8 that the combined fingerprint image is rotated and translated, the combined fingerprint image may be maintained and the registered fingerprint image may be rotated and translated based on a result of the phase correlation. Alternatively, both the combined fingerprint image and the registered fingerprint image may be rotated and translated.

FIG. 9 is a diagram illustrating an example of determining a similarity between a combined fingerprint image and a registered fingerprint image based on a Fourier-Merlin transform.

Referring to FIG. 9, a registered fingerprint image 910 is transformed into a first LPT image 915 through an FFT and an LPT, and a combined fingerprint image 920 is transformed into a second LPT image 925 also through an FFT and an LPT.

By a performed phase correlation 930 between the first LPT image 915 and the second LPT image 925, rotation information A between the registered fingerprint image 910 and the combined fingerprint image 920 may be determined. Based on a peak value detected through the phase correlation 930, a similarity between the registered fingerprint image 910 and the combined fingerprint image 920 may be determined.

The combined fingerprint image 920 may next be rotated based on the rotation information A determined by the phase correlation 930. In addition, translation information (Tx, Ty) between the registered fingerprint image 910 and the combined fingerprint image 920 may be determined by a phase correlation 950 between an FFT image obtained as a result of an FFT performed on the registered fingerprint image 910 and an FFT image obtained as a result of an FFT performed on a rotated combined fingerprint image 940.

Based on the rotation information A and the translation information (Tx, Ty), the registered fingerprint image 910 and the rotated combined fingerprint image 940 may be matched to each other, and a matching region between the registered fingerprint image 910 and the rotated combined fingerprint image 940 may be determined. In an example, a correlation may be calculated for the matching region based on Equation 1 above, and the calculated correlation may be determined to be the similarity between the registered fingerprint image 910 and the combined fingerprint image 920.

According to examples, the combined fingerprint image used to determine rotation information A may be different from the combined fingerprint image next used to determine the similarity from the matching region correlation, e.g., the two combined fingerprint images may be different combined fingerprint images generated according to different combination ratios.

Figure 10:
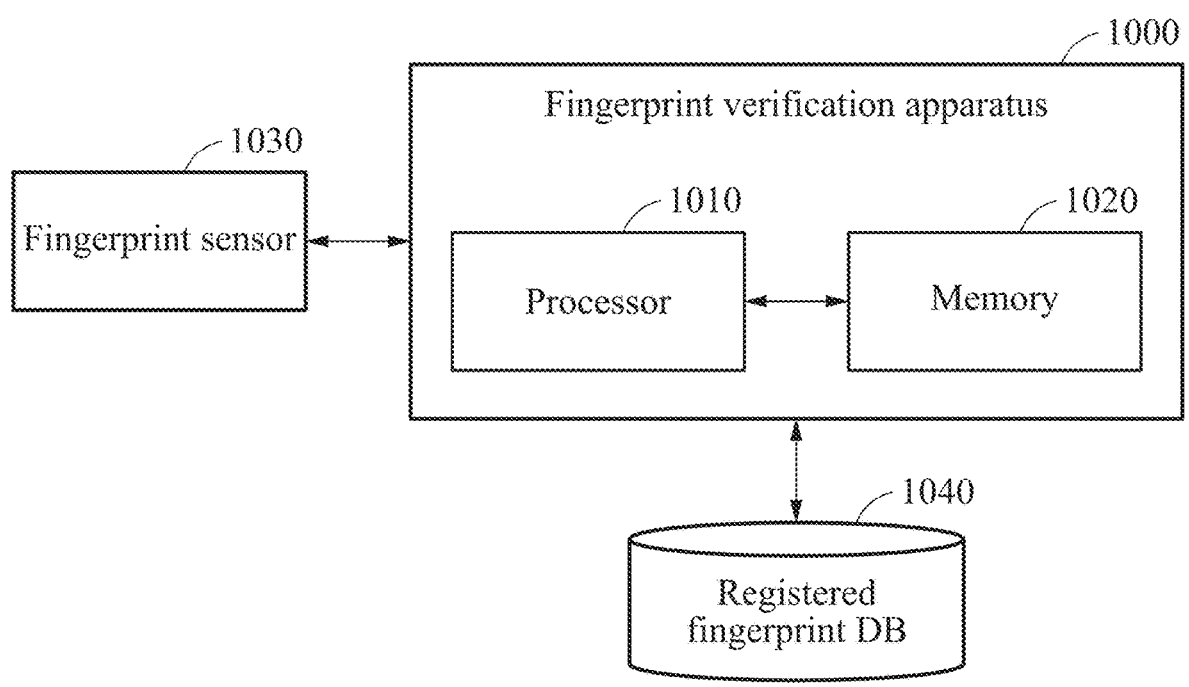
FIG. 10 is a diagram illustrating an example fingerprint verification apparatus.

FIG. 10 is a diagram illustrating an example fingerprint verification apparatus.

Referring to FIG. 10, a fingerprint sensor 1030 may obtain a query fingerprint image by obtaining fingerprint information of a user attempting fingerprint verification. The query fingerprint image may be transmitted to a fingerprint verification apparatus 1000, and the fingerprint verification apparatus 1000 may perform the fingerprint verification based on the query fingerprint image and one or more registered fingerprint images stored in a registered fingerprint DB 1040. The user may register fingerprint images for each finger in a fingerprint registration process. The registered fingerprint images may be stored in the registered fingerprint DB 1040.

The fingerprint verification apparatus 1000 includes a processor 1010 and a memory 1020. The memory 1020 may be connected to the processor 1010, and configured to store instructions executable by the processor 1010, data to be processed by the processor 1010, or data processed by the processor 1010.

The processor 1010 may control an overall operation of the fingerprint verification apparatus 1000, and execute instructions to perform one or more, or all, of operations described above with reference to FIGS. 1 through 9 and below with reference to FIG. 11. For example, the processor 1010 may receive a query fingerprint image, and obtain a processed fingerprint image by performing image processing on the query fingerprint image. In an example, the processor 1010 may perform filtering on the query fingerprint image using a frequency characteristic of a fingerprint feature of a registered fingerprint image. The frequency characteristic of the fingerprint feature of the registered fingerprint image may be based on an interval in a fingerprint pattern in the registered fingerprint image. In another example, the processor 1010 may perform filtering on the query fingerprint image using a frequency characteristic of a fingerprint feature of the query fingerprint image. The frequency characteristic of the fingerprint feature of the query fingerprint image may be based on an interval in a fingerprint pattern in the query fingerprint image. In still another example, the processor 1010 may determine whether to perform the image processing based on which one of the frequency characteristic of the registered fingerprint image and the frequency characteristic of the query fingerprint image, based on a state of the query fingerprint image, for example, an image quality of the query fingerprint image.

After generating the processed fingerprint image, the processor 1010 may obtain a combined (blended) fingerprint image by combining the query fingerprint image and the processed fingerprint image. The processor 1010 may determine a combination (blending) ratio between the query fingerprint image and the processed fingerprint image, and generate the combined fingerprint image by combining the query fingerprint image and the processed fingerprint image based on the determined combination ratio. The processor 1010 may determine a matching relationship between the fingerprint image and the registered fingerprint image, and determine a similarity in fingerprint pattern in the determined matching relationship. The processor 1010 may determine whether the fingerprint verification is successful or not as the result of the fingerprint verification based on the determined similarity.

In an example, the processor 1010 may determine a matching relationship between a first combined fingerprint image generated based on a first combination ratio and a registered fingerprint image, and determine a result of fingerprint verification based on a similarity between a second combined fingerprint image generated based on a second combination ratio and the registered fingerprint image. In this example, the first combination ratio and the second combination ratio may differ from each other. The processor 1010 may determine a similarity in fingerprint pattern when the second combined fingerprint image and the registered fingerprint image are in the determined matching relationship, and determine the result of the fingerprint verification based on the determined similarity.

In addition, while illustrated separately, any two or all or the fingerprint verification apparatus 1000, fingerprint sensor 1030, and the registered fingerprint DB may be presented in or as a same device or apparatus. In an example, such available collections of components may also correspond to the electronic apparatus 100 of FIG. 1.

Figure 11:
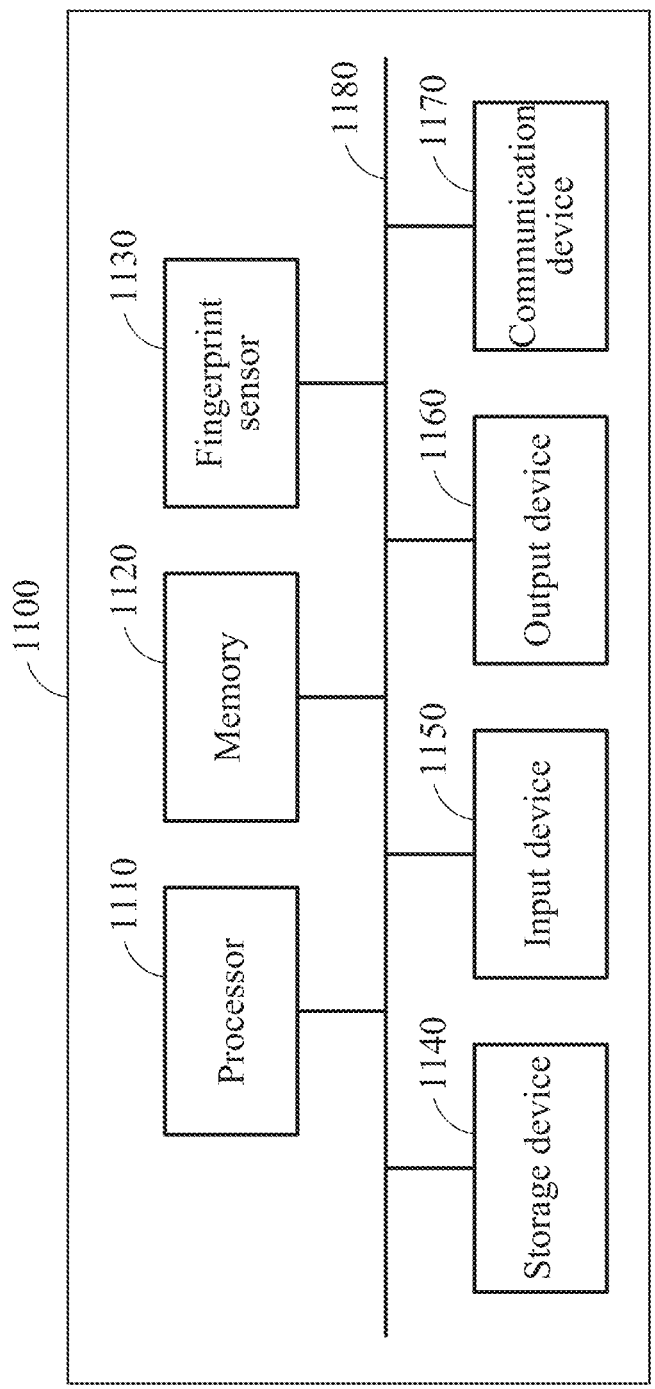
FIG. 11 is a diagram illustrating an example electronic apparatus.

FIG. 11 is a diagram illustrating an example electronic apparatus.

An electronic apparatus 1100 may obtain a query fingerprint image of a user attempting fingerprint verification, and perform the fingerprint verification based on the obtained query fingerprint image and a registered fingerprint image. The electronic apparatus 1100 may perform any combination or all of the operations described above with respect to the fingerprint verification apparatus 1000 of FIG. 10. The electronic apparatus 1100 may be, for example, a user terminal such as a mobile device or a wearable device. In an example, the electronic apparatus 1100 may also correspond to the electronic apparatus 100 of FIG. 1.

Referring to FIG. 11, the electronic apparatus 1100 may include a processor 1110, a memory 1120, a fingerprint sensor 1130, a storage device 1140, an input device 1150, an output device 1160, and a communication device 1170. The processor 1110, the memory 1120, the fingerprint sensor 1130, the storage device 1140, the input device 1150, the output device 1160, and the communication device 1170 may communicate with one another through a communication bus 1180.

The processor 1110 may control an overall operation of the electronic apparatus 1100, and execute functions and instructions in the electronic apparatus 1100. The processor 1110 may be configured to perform one or more, or all, of the operations or methods described above with reference to FIGS. 1 through 10. The processor 1110 may receive a query fingerprint image obtained through the fingerprint sensor 1130, and obtain a processed fingerprint image by performing image processing on the query fingerprint image. The processor 1110 may then obtain a combined (blended) fingerprint image by combining (blending) the query fingerprint image and the processed fingerprint image, and determine a result of fingerprint verification based on the combined fingerprint image and a registered fingerprint image.

The memory 1120 may store information for the processor 1110 to perform the fingerprint verification. For example, the memory 1120 may store instructions to be executed by the processor 1110, and store related information during the execution of software or an application in the electronic apparatus 1100. The memory 1120 may include, for example, a random-access memory (RAM), a dynamic RAM (DRAM), a static RAM (SRAM), or other types of nonvolatile memory that are well-known in the related technical field.

The fingerprint sensor 1130 may obtain a query fingerprint image of a user. The fingerprint sensor 1130 may be present as a separate and independent sensor, or provided in the form embedded in a button of the electronic apparatus 1100. Alternatively, the fingerprint sensor 1130 may be disposed inside the electronic apparatus 1100 and embodied in the form integrated into a display or otherwise under another surface of the electronic apparatus 1100 other than the display. For example, some or all of the surface of the display may be embodied as a sensing region, and the fingerprint sensor 1130 may obtain the query fingerprint image by sensing a query fingerprint of the user contacting the display of the electronic apparatus 1100. The fingerprint sensor 1130 may be configured to perform its sensing and/or image capturing operations through various methods, for example, an ultrasonic method, a mutual capacitance method, an infrared image capturing method, or the like. The fingerprint sensor 1130 may capture, as the query fingerprint image, an image of a fingerprint region corresponding to a certain portion of the sensing region. The fingerprint sensor 1130 may also be used to obtain and store a registered fingerprint image in a fingerprint registration process.

The storage device 1140 may include a computer-readable storage medium or a computer-readable storage device. The storage device 1140 may include a registered fingerprint DB that stores therein registered fingerprint images. The storage device 1140 may store a greater amount of information for a longer period of time compared to the memory 1120. The storage device 1140 may include, for example, a magnetic hard disk, an optical disc, a flash memory, a floppy disk, an electrically erasable programmable read-only memory (EEPROM), and other types of nonvolatile memory that are well-known in the related technical field.

The input device 1150 may receive an input from a user through, for example, a tactile input, a video input, an audio input, or a touch input. The input device 1150 may include, for example, a keyboard, a mouse, a touchscreen, a microphone, a retinal scanner, and other devices that may detect the input from the user and transmit the detected input to the electronic apparatus 1100.

The output device 1160 may provide an output of the electronic apparatus 1100 to a user through a visual, auditory, or tactile channel. The output device 1160 may include, for example, a liquid crystal display (LCD), a light-emitting diode (LED) display, a touchscreen, a speaker, a vibration generator, and other devices that may provide the output to the user. The output device 1150 may visualize the information associated with fingerprint verification and provide the visualized information to the user, through the display.

The communication device 1170 may communicate with an external device through a wired or wireless network. The communication device 1170 may receive and transmit data or information from and to an external device.

The fingerprint verification apparatuses, the electronic apparatuses, the fingerprint sensors, the registered fingerprint DBs, the electronic apparatus 100, the display 110, the fingerprint sensor 115, registered fingerprint DB 130, registered fingerprint DB 230, registered fingerprint DB 1040, fingerprint sensor 1030, fingerprint verification apparatus 1000, processor 1010, memory 1020, electronic apparatus 1100, processor 1110, memory 1120, fingerprint sensor 1130, storage device 1140, input device 1150, output device 1160, communication device 1170, and bus 1180, and other apparatuses, devices, modules, and components described herein with respect to FIGS. 1-11 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE-PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor implemented method, the method comprising:

obtaining a query fingerprint image through a fingerprint sensor;

obtaining a processed fingerprint image by performing image processing on the obtained query fingerprint image;

obtaining a blended fingerprint image by dynamically controlling a blending the query fingerprint image and the processed fingerprint image; and performing fingerprint verification based on the blended fingerprint image and a registered fingerprint image.

2. The method of claim 1, wherein the performing of the image processing comprises:

performing filtering on the query fingerprint image using a frequency characteristic of a fingerprint feature of the registered fingerprint image, wherein the frequency characteristic of the fingerprint feature of the registered fingerprint image is determined based on an interval in a fingerprint pattern in the registered fingerprint image.

3. The method of claim 1, wherein the performing of the image processing comprises:

performing filtering on the query fingerprint image using a frequency characteristic of a fingerprint feature of the query fingerprint image, wherein the frequency characteristic of the fingerprint feature of the query fingerprint image is determined based on an interval in a fingerprint pattern in the query fingerprint image.

4. The method of claim 1, wherein the performing of the image processing comprises:

measuring an image quality of the query fingerprint image; and in response to the measured image quality being determined to not satisfy a requirement, performing filtering on the query fingerprint image using a frequency characteristic of a fingerprint feature of the registered fingerprint image.

5. The method of claim 4, wherein the performing of the image processing further comprises:

in response to the measured image quality being determined to satisfy the requirement, performing filtering on the query fingerprint image using a frequency characteristic of a fingerprint feature of the query fingerprint image.

6. The method of claim 1, wherein the performing of the image processing comprises:

generating the processed fingerprint image with less noise than the query fingerprint image by performing filtering on the query fingerprint image.

7. The method of claim 1, wherein the obtaining of the blended fingerprint image comprises:

determining a blending ratio between the query fingerprint image and the processed fingerprint image; and generating the blended fingerprint image by blending the query fingerprint image and the processed fingerprint image based on the determined blending ratio.

8. The method of claim 7, wherein the determining of the blending ratio comprises:

determining the blending ratio based on at least one of an image quality of the query fingerprint image, an interval in a fingerprint pattern in the query fingerprint image, or a total number of fingerprint feature points detected in the query fingerprint image.

9. The method of claim 1, wherein the obtaining of the blended fingerprint image includes generating a first blended fingerprint image by blending the query fingerprint image and the processed fingerprint image based on a first blending ratio, and generating a second blended fingerprint image by blending the query fingerprint image and the processed fingerprint image based on a different second blending ratio.

10. The method of claim 9, wherein the performing of the fingerprint verification comprises:

determining a matching relationship between the first blended fingerprint image and the registered fingerprint image; and determining a result of the fingerprint verification based on a determined similarity, dependent on the determined matching relationship, between the second blended fingerprint image and the registered fingerprint image.

11. The method of claim 10, wherein the first blending ratio is determined based on an image quality of the query fingerprint image and an interval in a fingerprint pattern in the query fingerprint image, and wherein the second blending ratio is determined based on the image quality of the query fingerprint image and a total number of fingerprint feature points in the query fingerprint image.

12. The method of claim 1, wherein the performing of the fingerprint verification comprises:

determining a matching relationship between the blended fingerprint image and the registered fingerprint image;

determining a similarity between the blended fingerprint image and the registered fingerprint image based on the determined matching relationship; and determining a result of the fingerprint verification based on the determined similarity.

13. The method of claim 1, further comprising, in response to a successful result of the fingerprint verification, unlocking an apparatus with respect to user access of the apparatus, or implementing a user verified payment process, wherein the apparatus performs the processor implemented method.

14. The method of claim 13, wherein the obtaining of the query fingerprint image further comprises capturing image information, using the fingerprint sensor, of a finger opposing a surface of the display.

15. A non-transitory computer-readable storage medium storing instructions that, when executed by one or more processors, cause the one or more processors to perform the method of claim 1.

16. An apparatus, the apparatus comprising:

one or more processors configured to:

perform image processing on a query fingerprint image to obtain a processed fingerprint image;

dynamically control a blending of the query fingerprint image and the processed fingerprint image to obtain a blended fingerprint image; and perform fingerprint verification based on the blended fingerprint image and a registered fingerprint image.

17. The apparatus of claim 16, further comprising a fingerprint sensor configured to capture the query fingerprint image.

18. The apparatus of claim 17, further comprising a display, wherein the one or more processors are further configured to, in response to a successful result of the fingerprint verification, implement an unlocking of the apparatus with respect to user access of the apparatus as a user terminal, or implement a user verified payment process of the user terminal.

19. The apparatus of claim 18, wherein the apparatus is a mobile device and the fingerprint sensor is configured to capture image information of a finger opposing a surface of the mobile device.

20. The apparatus of claim 16, wherein, for the performance of the image processing, the one or more processors are configured to:
perform filtering on the query fingerprint image using a frequency characteristic of a fingerprint feature of the registered fingerprint image,
wherein the frequency characteristic of the fingerprint feature of the registered fingerprint image is determined based on an interval in a fingerprint pattern in the registered fingerprint image.

21. The apparatus of claim 16, wherein, for the performance of the image processing, the one or more processors are configured to:
perform filtering on the query fingerprint image using a frequency characteristic of a fingerprint feature of the query fingerprint image,
wherein the frequency characteristic of the fingerprint feature of the query fingerprint image is determined based on an interval in a fingerprint pattern in the query fingerprint image.

22. The apparatus of claim 16, wherein, for the blending of the query fingerprint image and the processed fingerprint image, the one or more processors are configured to:
determine a blending ratio between the query fingerprint image and the processed fingerprint image; and
generate the blended fingerprint image by blending the query fingerprint image and the processed fingerprint image based on the determined blending ratio.

23. The apparatus of claim 16, wherein the one or more processors are further configured to obtain the blended fingerprint image through implementation of a blending of the query fingerprint image and the processed fingerprint image based on a first blending ratio to generate a first blended fingerprint image, and through implementation of another blending of the query fingerprint image and the processed fingerprint image based on a different second blending ratio to generate a second blended fingerprint image.

24. The apparatus of claim 23, wherein, for the performance of the fingerprint verification, the one or more processors are configured to:
determine a matching relationship between the first blended fingerprint image and the registered fingerprint image; and
determine a result of the fingerprint verification based on a similarity, dependent on the determined matching relationship, between the second blended fingerprint image and the registered fingerprint image.

25. A user terminal comprising:
a fingerprint sensor configured to obtain a query fingerprint image;
a display; and
one or more processors configured to:
perform image processing on a query fingerprint image to obtain a processed fingerprint image;
combine, based on a determined ratio between the query fingerprint and the processed fingerprint image, the query fingerprint image and the processed fingerprint image to obtain a combined fingerprint image; and
perform fingerprint verification based on the combined fingerprint image and a registered fingerprint image.

26. The user terminal of claim 25, wherein the fingerprint sensor is disposed inside the user terminal and configured to obtain the query fingerprint image by sensing a query fingerprint of a user being in contact with the display.

27. The user terminal of claim 25,
wherein the user terminal is a mobile device, and
wherein the one or more processors are further configured to selectively, based on a result of the performed fingerprint verification, permit user access or use of one or more functions of the mobile device.

* * * * *